United States Patent
Su et al.

(10) Patent No.: US 12,546,639 B2
(45) Date of Patent: Feb. 10, 2026

(54) FLUID MEASUREMENT SENSOR AND MASS FLOW CONTROLLER

(71) Applicant: BEIJING AURASKY ELECTRONICS CO., LTD., Beijing (CN)

(72) Inventors: Qianyi Su, Beijing (CN); Manli He, Beijing (CN); Zonglin Yang, Beijing (CN)

(73) Assignee: Beijing Aurasky Electronics Co., Ltd., Beijing (CN)

( * ) Notice: Subject to any disclaimer, the term of this patent is extended or adjusted under 35 U.S.C. 154(b) by 294 days.

(21) Appl. No.: 18/268,599

(22) PCT Filed: Dec. 7, 2021

(86) PCT No.: PCT/CN2021/136005
§ 371 (c)(1),
(2) Date: Jun. 20, 2023

(87) PCT Pub. No.: WO2022/135134
PCT Pub. Date: Jun. 30, 2022

(65) Prior Publication Data
US 2024/0035870 A1    Feb. 1, 2024

(30) Foreign Application Priority Data

Dec. 22, 2020   (CN) .......................... 202011532748.8

(51) Int. Cl.
*G01F 15/14* (2006.01)
(52) U.S. Cl.
CPC .................. *G01F 15/14* (2013.01)

(58) Field of Classification Search
CPC ....................................................... G01F 15/14
(Continued)

(56) References Cited

U.S. PATENT DOCUMENTS 4,815,280 A * 3/1989 Tujimura .............. G01F 1/6847
73/204.22
5,347,861 A    9/1994 Satoh

FOREIGN PATENT DOCUMENTS

CN        101699228         4/2010
CN        101709986 A  *    5/2010
(Continued)

OTHER PUBLICATIONS

Translation of CN-101709986-A (Year: 2010).*
Translation of CN-106768113-B (Year: 2019).*
International Search Report dated Feb. 11, 2022.

*Primary Examiner* — Nathaniel T Woodward
(74) *Attorney, Agent, or Firm* — IPSILON USA, LLP (57) ABSTRACT

A fluid measurement sensor and a mass flow controller are provided. The fluid measurement sensor includes a sensor base, a cover plate, a housing, a sensing tube, and a thermal insulation layer; the housing is connected to the sensor base, the cover plate is connected to the housing from one side of the housing, an inner sidewall of the housing is provided with a first half groove, an inner sidewall of the cover plate is provided with a second half groove, and the first half groove and the second half groove form a mounting groove; and the sensing tube is provided with windings wound round the sensing tube, the sensing tube wrapped by the thermal insulation layer is disposed in the mounting groove, and two ends of the sensing tube penetrate through the sensor base.

20 Claims, 10 Drawing Sheets

(58) Field of Classification Search
USPC .......................................................... 73/431
See application file for complete search history.

(56) References Cited

FOREIGN PATENT DOCUMENTS

| CN | 203310455 | | 11/2013 | | |
|---|---|---|---|---|---|
| CN | 106768113 | | 5/2017 | | |
| CN | 209181849 | | 7/2019 | | |
| CN | 106768113 B | * | 10/2019 | ............. | G01F 15/02 |
| CN | 112816011 | | 5/2021 | | |

* cited by examiner

FLUID MEASUREMENT SENSOR AND MASS FLOW CONTROLLER

RELATED APPLICATION

This application is a National Phase of PCT/CN2021/136005 filed on Dec. 7, 2021, which claims the benefit of priority from Chinese Patent Application No. 202011532748.8, filed on Nov. 26, 2020, the entirety of which are incorporated by reference.

TECHNICAL FIELD

The present disclosure belongs to the technical field of sensors, and particularly relates to a fluid measurement sensor and a mass flow controller.

BACKGROUND

A gas mass flow controller is an instrument for accurately measuring and controlling gas flow, and plays an important role in scientific research and production in various fields. As an important core component in the gas mass flow controller, a fluid measurement sensor has a direct influence on overall performance indexes of the gas mass flow controller.

The fluid measurement sensor is a thermal fluid measurement sensor, and adopts a capillary heat-transfer temperature difference calorimetry principle to measure a flow rate of a fluid, and a distribution curve of temperatures inside the fluid measurement sensor should achieve left-right symmetry when no fluid flows through the fluid measurement sensor (that is, the flow rate is zero). However, heat distribution inside the fluid measurement sensor is made asymmetric due to some reasons such as an unreasonable design of an internal structure of the fluid measurement sensor and loosening of an internal part, so that the distribution curve of the temperatures inside the fluid measurement sensor is shifted. Such shift is not caused by the fluid flowing through the fluid measurement sensor, and what is caused by the uneven heat distribution inside the fluid measurement sensor is zero drift of the fluid measurement sensor. At present, the zero drift is a common problem of existing fluid measurement sensors. The zero drift of the fluid measurement sensor is a main reason for the problems of the gas mass flow controller, such as poor precision, poor linearity, and poor repeatability.

In the existing fluid measurement sensor, two housings are combined into a cavity, and a sensing tube and a bracket are fixed with the housings by gluing. Heat inside such structure can easily dissipate from a joint between the two housings, so that the left-right symmetry of the heat distribution inside the fluid measurement sensor cannot be ensured, resulting in the zero drift of the fluid measurement sensor.

SUMMARY

The present disclosure aims to provide a fluid measurement sensor and a mass flow controller for effectively suppressing the zero drift.

In order to achieve the above objective, the present disclosure provides a fluid measurement sensor, including a sensor base, a cover plate, a housing, a sensing tube, and a thermal insulation layer; wherein the housing is connected to the sensor base, the cover plate is connected to the housing from one side of the housing, an inner sidewall of the housing is provided with a first half groove, an inner sidewall of the cover plate is provided with a second half groove, and the first half groove and the second half groove form a mounting groove; and the sensing tube is provided with windings wound round the sensing tube, the thermal insulation layer wraps the windings, the sensing tube wrapped by the thermal insulation layer is disposed in the mounting groove, and two ends of the sensing tube penetrate through the sensor base.

Preferably, the sensing tube includes an enclosed section and two bent sections on two sides of the enclosed section, and the two bent sections are bent along a same direction towards the sensor base relative to the enclosed section; and a shape of the mounting groove is matched with a shape of an integral body formed by the enclosed section and the two bent sections, the windings include a first winding and a second winding, the first winding and the second winding are symmetrically wound round the enclosed section, and the thermal insulation layer at least wraps the enclosed section.

Preferably, the thermal insulation layer is filled in space where the enclosed section is located.

Preferably, the fluid measurement sensor further includes a bracket including a first plate and a second plate, and the first plate includes a bent portion and a support portion, which form an included angle; the sensor base is provided with a first groove having a shape matched with the bent portion, and the bent portion is connected to the first groove through a first screw; and the support portion is located on a side of the bent portion away from the sensor base and is connected to the second plate; and a mounting arm is provided at each of two ends of the second plate, two mounting arms are provided with a first hole and a second hole respectively, the sensor base is provided with two third holes, and the two third holes are corresponding to the first hole and the second hole respectively; and one of the bent sections of the sensing tube penetrates through the first hole and one of the two third holes, and extends to a bottom surface of the sensor base, and the other of the bent sections of the sensing tube penetrates through the second hole and the other of the two third holes, and extends to the bottom surface of the sensor base.

Preferably, the shape of the bent portion and the shape of the first groove are such set that rotational freedom of the bent portion is limited.

Preferably, a sealing material is provided between the two bent sections of the sensing tube and the sensor base; and/or the two bent sections of the sensing tube are fixedly connected to the first hole and the second hole respectively through full soldering or full gluing.

Preferably, the fluid measurement sensor further includes a pressing block and a lead-out wire, one end of the lead-out wire is provided with four connection terminals, and two ends of the first winding and two ends of the second winding are electrically connected to the four connection terminals respectively; and the pressing block is connected to the sensor base, and is located between the cover plate and the sensor base, a second groove is formed at a bottom of the pressing block, the pressing block presses the lead-out wire in the second groove, and the other end of the lead-out wire passes through the second groove and extends to an outer side of the cover plate through space between the pressing block and the sensor base.

Preferably, the sensor base is provided with a third groove, and the third groove is disposed opposite to the pressing block and configured to accommodate an electronic component on the lead-out wire.

Preferably, an inner side face of the housing is provided with a fourth groove, and the support portion, the second plate, and the two mounting arms are located in the fourth groove; and a fifth groove is formed at a bottom of the housing, a gap is formed between the fifth groove and the first groove, and the first screw is located in the gap.

Preferably, a pair of first annular grooves and a pair of second annular grooves are formed on the bottom surface of the sensor base, each of the first annular grooves and each of the second annular grooves are concentrically arranged with one of the third holes, and the first annular grooves are on outer sides of the second annular grooves; and the first annular grooves are configured to accommodate sealing rings.

Preferably, an inner side face of the housing is provided with a sixth groove, the cover plate is located in the sixth groove, and two side edges of the housing located on two sides of the sixth groove are foldable, so as to fix the cover plate in the sixth groove by folding the two side edges after the cover plate is installed in the sixth groove.

The present disclosure further provides a mass flow controller, including the fluid measurement sensor described above.

The present disclosure has the beneficial effects as follows: in the fluid measurement sensor provided by the present disclosure, the cover plate is connected to the housing from one side of the housing, the inner sidewall of the housing is provided with the first half groove, the inner sidewall of the cover plate is provided with the second half groove, the first half groove and the second half groove form the mounting groove, and the sensing tube with the windings wrapped by the thermal insulation layer is disposed in the mounting groove. Since the windings of the sensing tube are wrapped by the thermal insulation layer which can block heat generated by the windings, the heat can be prevented from dissipating from a joint between the cover plate and the housing, thereby avoiding zero drift caused by such dissipation of the heat.

The mass flow controller provided by the present disclosure can effectively suppress the zero drift by adopting the fluid measurement sensor provided by the present disclosure.

Other features and advantages of the present disclosure will be described in detail in the following Detailed Description.

BRIEF DESCRIPTION OF DRAWINGS

The above and other objectives, features and advantages of the present disclosure will become more apparent by describing exemplary embodiments of the present disclosure in detail with reference to the accompanying drawings. In the exemplary embodiments of the present disclosure, the same reference numeral generally represents the same part.

FIG. 8b is a sectional view of the housing taken along A-A in FIG. 8a;

REFERENCE NUMERALS

1—sensor base, 11—first annular groove, 12—second annular groove, 13—third hole, 14—mounting hole, 15—third groove, 16—first groove, 17—second threaded hole, 18, 19—first mounting holes; 2—pressing block, 21—second groove; 3—lead-out wire, 31—connection terminal; 4—cover plate; 5—housing, 51—sixth groove, 52—first half groove, 53—fourth groove, 54—fifth groove, 55—opening; 56—side edge; 6—thermal insulation layer; 7—bracket, 71—first hole, 72—second hole, 73—first plate; 731—bent portion; 732—support portion; 74—second plate; 75—mounting arm; 8—first screw; 9—sensing tube; 9a—enclosed section; 9b, 9c—bent sections; 91—first winding, 92—second winding; 93—wire; 10—second screw.

DETAIL DESCRIPTION OF EMBODIMENTS

Preferred embodiments of the present disclosure will be described in more detail below. Although the preferred embodiments of the present disclosure are described below, it should be understood that the present disclosure may be embodied in various forms and should not be limited by the embodiments described herein. Rather, these embodiments are provided for making the present disclosure more thorough and complete, and fully conveying the scope of the present disclosure to those of ordinary skill in the art.

In order to solve the problems in the prior art, the present disclosure provides a fluid measurement sensor, including a sensor base, a cover plate, a housing, a sensing tube, and a thermal insulation layer; the housing is connected to the sensor base, the cover plate is connected to the housing from one side of the housing, an inner sidewall of the housing is provided with a first half groove, an inner sidewall of the cover plate is provided with a second half groove, and the first half groove and the second half groove form a mounting groove; and the sensing tube is provided with windings wound round the sensing tube, the thermal insulation layer wraps the windings, the sensing tube wrapped by the thermal insulation layer is disposed in the mounting groove, and two ends of the sensing tube penetrate through the sensor base.

In the fluid measurement sensor of the present disclosure, the cover plate is connected to the housing from one side of the housing, the inner sidewall of the housing is provided with the first half groove, the inner sidewall of the cover plate is provided with the second half groove, the first half groove and the second half groove form the mounting groove, and the sensing tube wrapped by the thermal insulation layer is disposed in the mounting groove. Since the windings of the sensing tube are wrapped by the thermal insulation layer which can block heat generated by the windings, the heat can be prevented from dissipating from a joint between the cover plate and the housing, thereby avoiding zero drift caused by such dissipation of the heat.

Preferably, the thermal insulation layer is made of insulation cotton. The sensing tube is disposed in the middle of the mounting groove, and the insulation cotton wraps the windings. Thus, the heat can be prevented from dissipating from the joint between the cover plate and the housing, thereby avoiding the zero drift of the sensor caused by such dissipation of the heat.

Preferably, the sensing tube includes an enclosed section and two bent sections on two sides of the enclosed section, the two bent sections are bent along a same direction towards the sensor base relative to the enclosed section, and the enclosed section and the two bent sections approximately form an n-shaped tube; moreover, a shape of the mounting groove is matched with a shape of an integral body formed by the enclosed section and the two bent sections, that is, the mounting groove is approximately an n-shaped groove. The windings include a first winding and a second winding, which are symmetrically wound round the enclosed section, and the thermal insulation layer at least wraps the enclosed section.

A radial section shape of a portion of the mounting groove corresponding to the enclosed section may be a rectangle or other shapes having non-uniform sizes in a circumferential direction. Thus, rotational freedom of the thermal insulation layer disposed in the mounting groove can be limited, and installation displacement of the thermal insulation layer can be avoided, so that the sensing tube wrapped by the thermal insulation layer can be effectively fixed.

Preferably, the thermal insulation layer is filled in the space where the enclosed section is located. That is, the space where the enclosed section is located in the mounting groove is filled up with the thermal insulation layer. Thus, it can be ensured that the enclosed section is motionlessly fixed in the mounting groove, which can facilitate improving installation precision of the sensing tube and ensure symmetrical arrangement of the windings around the sensing tube, so that symmetrical heat distribution can be realized, which is beneficial to reduction of the zero drift. Specifically, the sensing tube in the mounting groove is located in the middle of the mounting groove, which facilitates ensuring uniformity of heat dissipation at different positions of the sensing tube, thereby favoring the reduction of the zero drift.

Preferably, the fluid measurement sensor further includes a bracket including a first plate and a second plate, the first plate includes a bent portion and a support portion, the sensor base is provided with a first groove having a shape matched with the bent portion, and the bent portion is connected to the first groove through a first screw. Specifically, a first threaded hole is formed in the middle of the first groove, and the first screw is in threaded connection with the first threaded hole, thereby fixing the bent portion of the first plate on the sensor base. The support portion is located on a side of the bent portion away from the sensor base and is connected to the second plate.

A mounting arm is provided at each of two ends of the second plate, the two mounting arms are provided with a first hole and a second hole respectively, and the sensor base is provided with two third holes, which are corresponding to the first hole and the second hole respectively; and one of the bent sections of the sensing tube penetrates through the first hole and one of the two third holes, and extends to a bottom surface of the sensor base, and the other bent section of the sensing tube penetrates through the second hole and the other third hole, and extends to the bottom surface of the sensor base. With the two mounting arms, the two bent sections of the sensing tube can be effectively fixed, and installation displacement of the two bent sections can be avoided.

Preferably, the shapes of the bent portion and the first groove are such set that rotational freedom of the bent portion can be limited. Thus, it can be ensured that the bent portion is not rotated when disposed in the first groove, so that installation firmness can be improved, and improvement in operational reliability of the fluid measurement sensor can be facilitated. For example, the bent portion of the first plate may be in a rectangular shape, and the shape of the first groove is matched with the shape of the bent portion.

When the sensing tube is installed, the two bent sections of the sensing tube face downwards and are installed from top to bottom. Specifically, the two bent sections are first made to respectively penetrate through the first hole and the second hole of the bracket, and then respectively penetrate through the two third holes of the sensor base, and finally end faces of the two bent sections of the sensing tube are made flush with the bottom surface of the sensor base, thereby realizing installation and positioning of the sensing tube.

Preferably, a sealing material is provided between the two bent sections of the sensing tube and the sensor base; and/or the two bent sections of the sensing tube are fixedly connected to the first hole and the second hole respectively through full soldering or full gluing. The space between each of the two bent sections of the sensing tube and the sensor base may be sealed by welding or gluing, and the sealing material is, for example, glue or a welding leg. The two bent sections of the sensing tube may be fixed with the first hole and the second hole respectively by soldering or gluing, and when performing soldering or gluing, the first hole and the second hole are filled up with a filler material such as tin or glue. Thus, on the one hand, firm connection between the two bent sections of the sensing tube and the bracket can be ensured. On the other hand, by controlling the amount of the tin or the glue filled in each of the first hole and the second hole, the amount of the tin or the glue used for the first hole may be made almost the same as the amount of the tin or the glue used for the second hole, so that left-right symmetry of the fluid measurement sensor can be ensured, thereby favoring the reduction of the zero drift.

Preferably, the fluid measurement sensor further includes a pressing block and a lead-out wire, one end of the lead-out wire is provided with four connection terminals, and two ends of the first winding and two ends of the second winding are electrically connected to the four connection terminals respectively; and the pressing block is connected to the sensor base, and is located between the cover plate and the sensor base, for example, the pressing block may be fastened to the sensor base through two second screws. A second groove is formed at a bottom of the pressing block, the pressing block presses the lead-out wire in the second groove, and the other end of the lead-out wire passes through the second groove and extends to an outer side of the cover plate through the space between the pressing block and the sensor base. Thus, the lead-out wire can be firmly fixed to ensure accurate positioning thereof, and meanwhile, the second groove can prevent the lead-out wire from being crushed and misplaced, which is beneficial to the improvement in the operational reliability of the fluid measurement sensor and the reduction of the zero drift.

Preferably, a depth of the second groove is greater than or equal to 0.1 mm and less than or equal to 0.3 mm. By setting the depth of the second groove in such range, the pressing block can be prevented from applying overlarge pressure to damage the lead-out wire while the lead-out wire can be fixed.

Each of the first winding and the second winding may be formed by winding a sensing wire, the two ends of the first winding and the two ends of the second winding are respectively corresponding to and connected to the four connection terminals of the lead-out wire with good electric conduction.

Preferably, the sensor base is provided with a third groove, which is disposed opposite to the pressing block and configured to accommodate an electronic component on the lead-out wire. With the third groove, the electronic component can be prevented from being squeezed. The third groove may be a rectangular groove.

Preferably, an inner side face of the housing is provided with a fourth groove, and the support portion, the second plate, and the two mounting arms are located in the fourth groove. The fourth groove is configured to accommodate the support portion, the second plate, and the two mounting arms, so as to ensure that the bracket has enough installation space, and also ensure that the housing does not interfere with installation of the bracket. Further preferably, the support portion, the second plate, and the two mounting arms in the fourth groove are not in contact with the housing, so that the bracket can be prevented from being affected by a temperature change of the housing, thereby effectively suppressing the zero drift.

A fifth groove is formed at a bottom of the housing, a gap is formed between the fifth groove and the first groove, and the first screw is located in the gap. The fifth groove is configured to avoid the first screw, so as to ensure normal installation of the first screw.

Preferably, a pair of first annular grooves and a pair of second annular grooves are formed on the bottom surface of the sensor base, each first annular groove and each second annular groove are concentrically arranged with one of the third holes, and the first annular grooves are on outer sides of the second annular grooves; and the first annular grooves are configured to accommodate sealing rings.

When the space between each of the two bent sections of the sensing tube and the sensor base is sealed by welding, the second annular grooves may play a role of releasing stress and ensuring reliable sealing of the welding. The first annular grooves are configured to accommodate the sealing rings, which perform a sealing function when the flow measurement sensor is applied to a gas mass flow controller.

Preferably, the inner side face of the housing is provided with a sixth groove, the cover plate is located in the sixth groove, and two side edges of the housing located on two sides of the sixth groove are foldable, so as to fix the cover plate in the sixth groove by folding the two side edges after the cover plate is installed in the sixth groove. Such fixing method is simple, can realize reliable fixing, and can also greatly reduce a volume of the fluid measurement sensor. Apparently, the cover plate may be fixed with other methods in practical applications, for example, the cover plate may be fixed on the housing by being wrapped with an adhesive tape or by gluing.

Preferably, the sensor base is provided with two first mounting holes, a bottom surface of the housing is provided with two second threaded holes corresponding to the two first mounting holes, and the fluid measurement sensor further includes the two second screws. One of the two second screws penetrates through one of the first mounting holes to be in threaded connection with the second threaded hole corresponding to the one of the first mounting holes, and the other second screw penetrates through the other first mounting hole to be in threaded connection with the other second threaded hole, thereby fixing the housing on the sensor base.

In addition, the sensor base may be further provided with a plurality of second mounting holes for connection with a mounting component such as the gas mass flow controller.

As can be seen from the above, in the fluid measurement sensor provided by the present disclosure, the mounting groove formed between the cover plate and the housing has a symmetrical structure, the sensing tube is symmetrically arranged, and the windings around the sensing tube are also symmetrically arranged, so that the heat passing through the sensing tube is also symmetrically distributed, thereby facilitating the reduction of the zero drift. Moreover, the fluid measurement sensor of the present disclosure can effectively reduce the zero drift. Therefore, when the fluid measurement sensor is applied to the gas mass flow controller, indexes such as zero drift, precision, and repeatability of the gas mass flow controller, can be greatly improved, and meanwhile, production efficiency of the gas mass flow controller can be greatly increased.

The present disclosure further provides a mass flow controller, including the fluid measurement sensor described above.

First Embodiment

Figure 1:
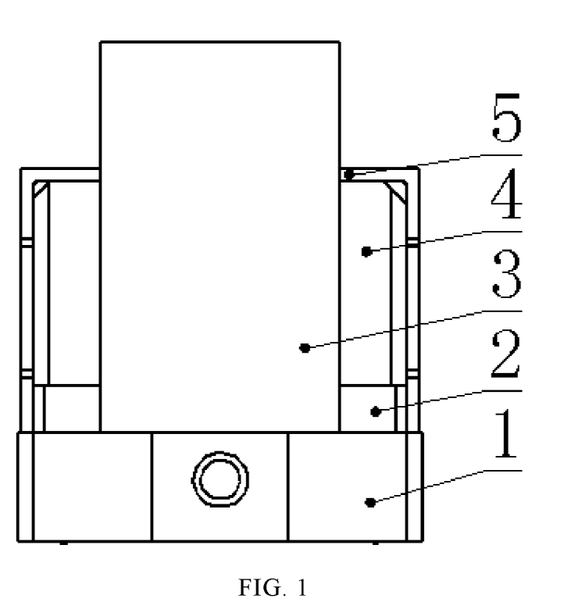
FIG. 1 is a schematic structural diagram of a fluid measurement sensor according to an embodiment of the present disclosure.
Figure 2A:
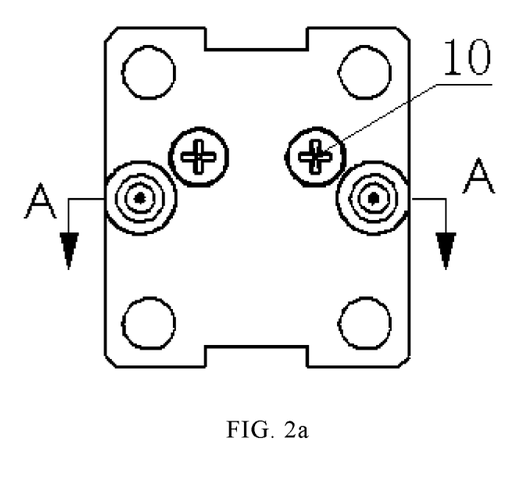
FIG. 2a is a bottom view of the fluid measurement sensor according to an embodiment of the present disclosure.
Figure 2B:
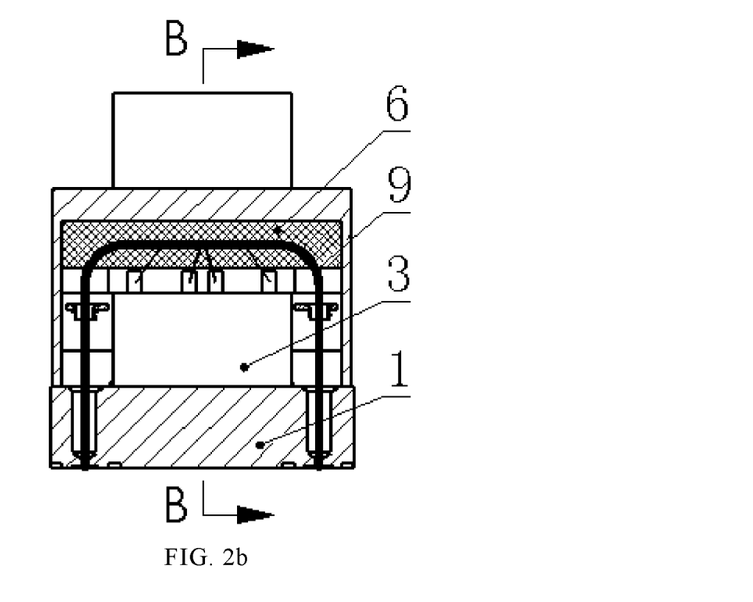
FIG. 2b is a sectional view taken along A-A in FIG. 2a, and FIG. 2c is a sectional view taken along B-B in FIG. 2b.
Figure 2C:
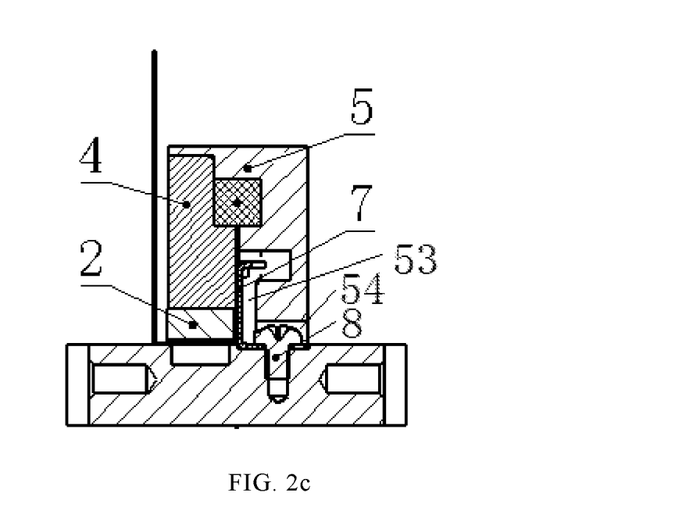

As shown in FIG. 1 to FIG. 11c, the present disclosure provides the fluid measurement sensor, including the sensor base 1, the cover plate 4, the housing 5, the sensing tube 9, and the thermal insulation layer 6; the housing 5 is connected to the sensor base 1, and the cover plate 4 is connected to the housing 5 from one side of the housing 5, for example, as shown in FIG. 2c, the cover plate 4 is embedded in the housing 5 from one side of the housing 5. The inner sidewall of the housing 5 is provided with the first half groove 52, the inner sidewall of the cover plate 4 is provided with the second half groove, and the first half groove 52 and the second half groove form the mounting groove; and the sensing tube 9 is provided with the windings wound round the sensing tube 9, as shown in FIG. 2b, the thermal insulation layer 6 wraps the windings, the sensing tube 9 wrapped by the thermal insulation layer 6 is disposed in the mounting groove, and the two ends of the sensing tube 9 penetrate through the sensor base 1.

In this embodiment, the thermal insulation layer 6 is made of the insulation cotton. After the sensing tube 9 wrapped by the thermal insulation layer 6 is disposed in the mounting groove, the sensing tube 9 may be positioned in the middle of the mounting groove under limiting action of the insulation cotton, which facilitates ensuring the uniformity of the heat dissipation at different positions of the sensing tube, thereby favoring the reduction of the zero drift.

Figure 4:
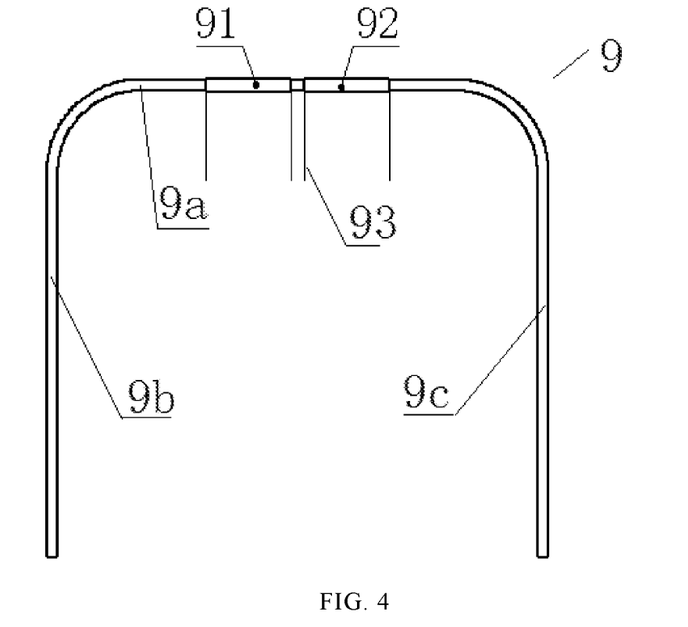
FIG. 4 is a schematic diagram of a sensing tube in the fluid measurement sensor according to an exemplary embodiment of the present disclosure.

As shown in FIG. 4, the sensing tube 9 includes the enclosed section 9a and the two bent sections (9b, 9c) on the two sides of the enclosed section 9a, the two bent sections (9b, 9c) are bent along the same direction towards the sensor base 1 relative to the enclosed section 9a (such as bent towards the bottom of FIG. 4), and the enclosed section 9a and the two bent sections (9b, 9c) approximately form an n-shaped tube; moreover, the shape of the mounting groove is matched with the shape of the integral body formed by the enclosed section 9a and the two bent sections (9b, 9c), that is, the mounting groove is approximately an n-shaped groove. The windings include the first winding 91 and the second winding 92, which are symmetrically wound round the enclosed section 9a, and as shown in FIG. 2b, the thermal insulation layer 6 at least wraps the enclosed section 9a. Specifically, in addition to wrapping the enclosed section 9a, the thermal insulation layer 6 may further wrap connection portions of the enclosed section 9a and the two bent sections (9b, 9c). Apparently, the thermal insulation layer 6 may only wrap the enclosed section 9a in practical applications.

In some optional embodiments, the radial section shape of the portion of the mounting groove corresponding to the enclosed section 9a may be a rectangle or other shapes having non-uniform sizes in a circumferential direction. Thus, the rotational freedom of the thermal insulation layer 6 disposed in the mounting groove can be limited, and the installation displacement of the thermal insulation layer can be avoided, so that the sensing tube 9 wrapped by the thermal insulation layer 6 can be effectively fixed.

Preferably, as shown in FIG. 2b, the thermal insulation layer 6 is filled in the space where the enclosed section 9a is located. That is, the space where the enclosed section 9a is located in the mounting groove is filled up with the thermal insulation layer 6. Thus, it can be ensured that the enclosed section 9a is motionlessly fixed in the mounting groove, which facilitates improving the installation precision of the sensing tube 9 and ensures the symmetrical arrangement of the windings around the sensing tube 9, so that the symmetrical heat distribution can be realized, which is beneficial to the reduction of the zero drift.

Figure 3:
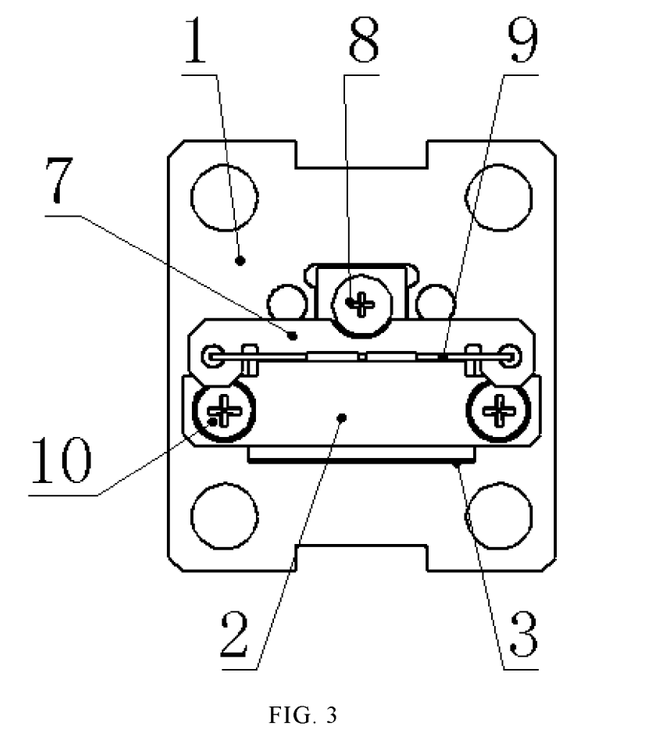
FIG. 3 is a schematic diagram of an installation structure of a bracket and a sensing tube in the fluid measurement sensor according to an exemplary embodiment of the present disclosure.
Figure 5A:
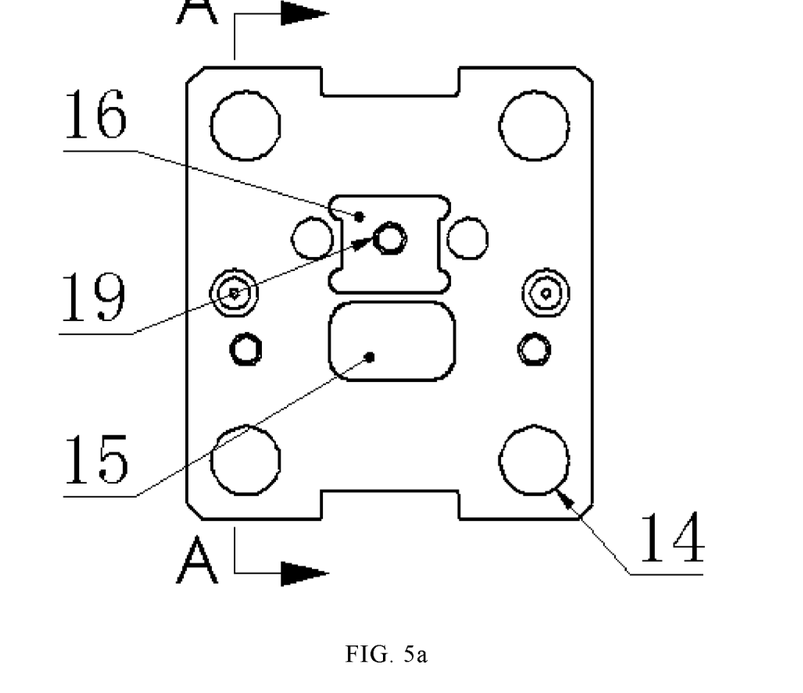
FIG. 5a is a top view of a sensor base in the fluid measurement sensor according to an exemplary embodiment of the present disclosure.
Figure 7A:
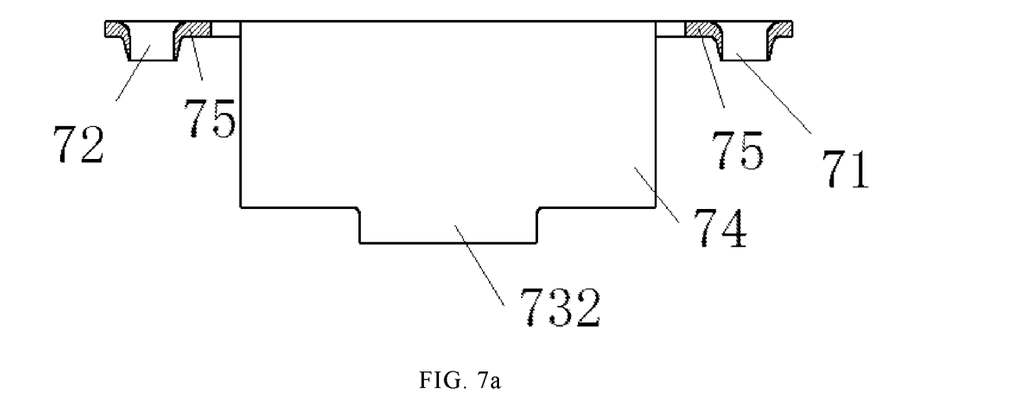
FIG. 7a is a front view of a bracket in the fluid measurement sensor according to an exemplary embodiment of the present disclosure.
Figure 7B:
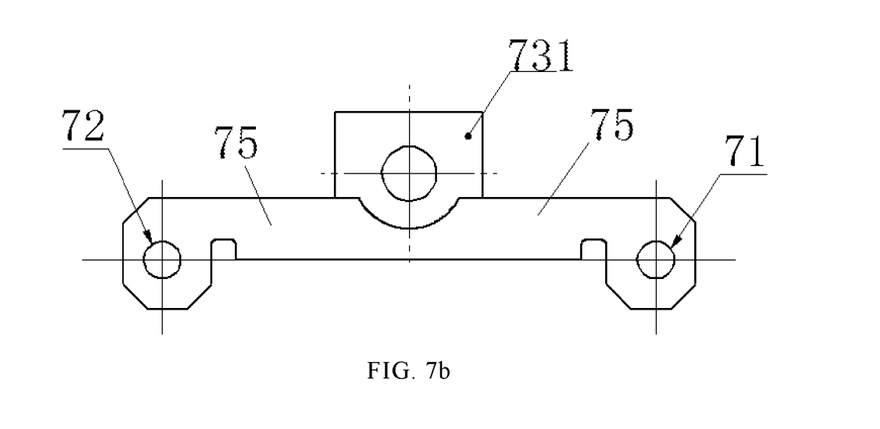
FIG. 7b is a top view of the bracket.
Figure 7C:
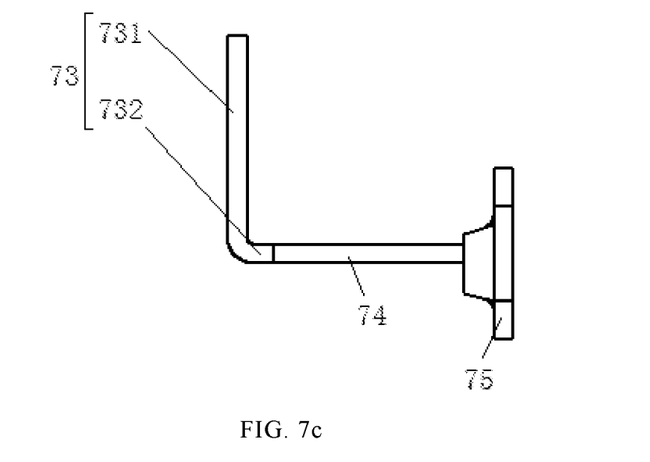
FIG. 7c is a side view of the bracket.

In this embodiment, the fluid measurement sensor further includes the bracket 7, with reference to FIG. 7a to FIG. 7c, the bracket 7 includes the first plate 73 and the second plate 74, the first plate 73 includes the bent portion 731 and the support portion 732. As shown in FIG. 3 and FIG. 5a, the sensor base 1 is provided with the first groove 16 having the shape matched with the bent portion, and the bent portion 731 is connected to the first groove 16 through the first screw 8. Specifically, the first threaded hole 19 is formed in the middle of the first groove 16, and the first screw 8 is in threaded connection with the first threaded hole 19, thereby fixing the bent portion 731 of the first plate 73 on the sensor base 1. The support portion 732 is located on the side of the bent portion 731 away from the sensor base 1 and is connected to the second plate 74. Optionally, the support portion 732 is connected to the middle of the second plate 74, so as to ensure stability of the support for the second plate 74 and structural symmetry of the bracket 7.

Figure 5B:
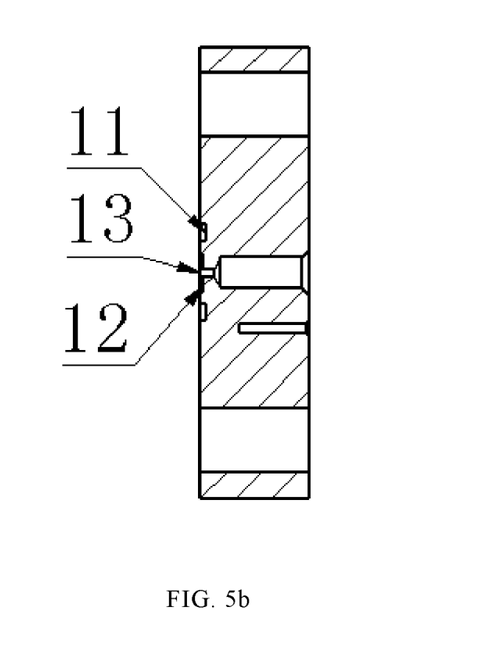
FIG. 5b is a sectional view taken along A-A in FIG. 5b.

The mounting arm 75 is provided at each of the two ends of the second plate 74, the two mounting arms 75 are provided with the first hole 71 and the second hole 72 respectively, and as shown in FIG. 5b, the sensor base 1 is provided with the two third holes 13, which are corresponding to the first hole 71 and the second hole 72 respectively; and one bent section 9b of the sensing tube 9 penetrates through the first hole 71 and one of the two third holes 13, and extends to the bottom surface of the sensor base 1, and the other bent section 9c of the sensing tube 9 penetrates through the second hole 72 and the other third hole 13, and extends to the bottom surface of the sensor base 1. With the two mounting arms 75, the two bent sections (9b, 9c) of the sensing tube 9 can be effectively fixed, and the installation displacement of the two bent sections (9b, 9c) can be avoided.

Preferably, the bent portion 731 and the shape of the first groove 16 are such set that the rotational freedom of the bent portion can be limited. Thus, it can be ensured that the bent portion 731 is not rotated when disposed in the first groove 16, so that the installation firmness can be improved, and the improvement in the operational reliability of the fluid measurement sensor can be facilitated. For example, the bent portion 731 of the first plate 73 may be in the rectangular shape, and the shape of the first groove 16 is matched with the shape of the bent portion 731.

When the sensing tube 9 is installed, the two bent sections (9b, 9c) of the sensing tube 9 face downwards and are installed from top to bottom. Specifically, the two bent sections (9b, 9c) are first made to respectively penetrate through the first hole 71 and the second hole 72, and then respectively penetrate through the two third holes 13 of the sensor base 1, and finally the end faces of the two bent sections (9b, 9c) of the sensing tube 9 are made flush with the bottom surface of the sensor base 1, thereby realizing the installation and positioning of the sensing tube 9.

The sealing material is provided between the two bent sections (9b, 9c) of the sensing tube 9 and the sensor base 1; and the two bent sections (9b, 9c) of the sensing tube 9 are fixedly connected to the first hole 71 and the second hole 72 through full gluing. The space between each of the two bent sections (9b, 9c) of the sensing tube 9 and the sensor base 1 are sealed by welding, and the sealing material is the welding leg. When gluing is carried out, the first hole 71 and the second hole 72 are filled up with the glue. Thus, on the one hand, the firm connection between the two bent sections (9b, 9c) of the sensing tube 9 and the bracket 7 can be ensured. On the other hand, by controlling the amount of the glue filled in each of the first hole 71 and the second hole 72, the amount of the glue used for the first hole 71 may be made almost the same as the amount of the glue used for the second hole 72, so that the left-right symmetry of the fluid measurement sensor is ensured, thereby favoring the reduction of the zero drift.

Figure 6A:
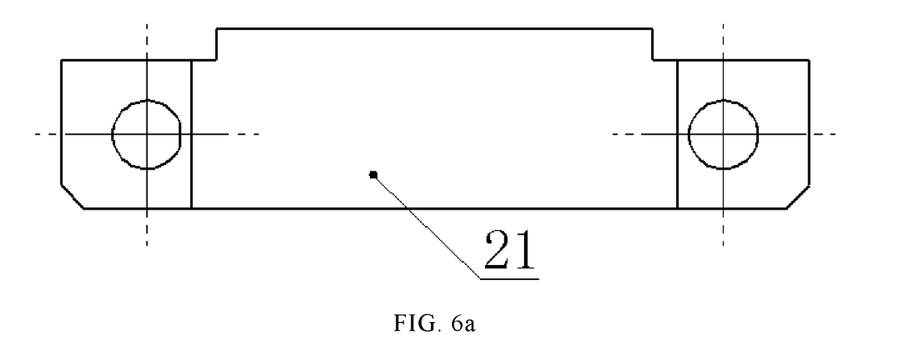
FIG. 6a is a top view of a pressing block in the fluid measurement sensor according to an exemplary embodiment of the present disclosure.
Figure 6B:
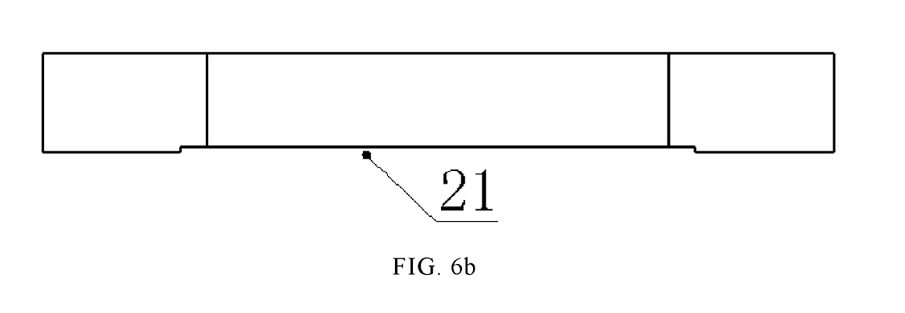
FIG. 6b is a front view of the pressing block.
Figure 9A:
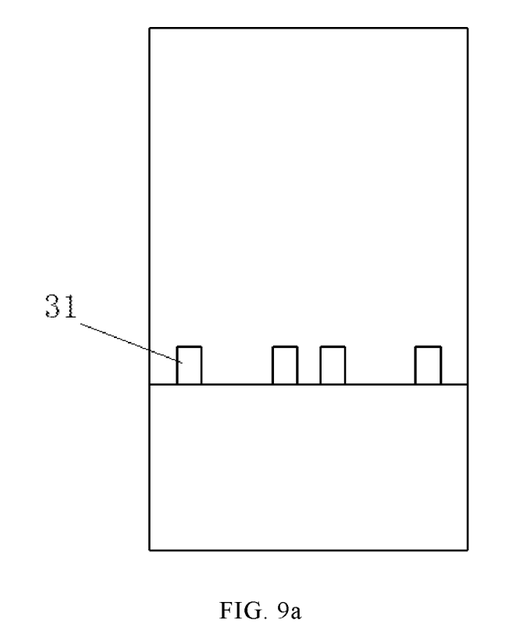
FIG. 9a is a front view of a lead-out wire in the fluid measurement sensor according to an exemplary embodiment of the present disclosure.
Figure 9B:
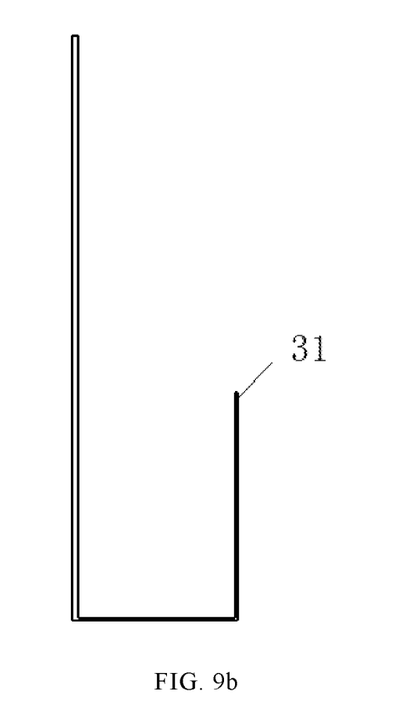
FIG. 9b is a side view of the lead-out wire.
Figure 10A:
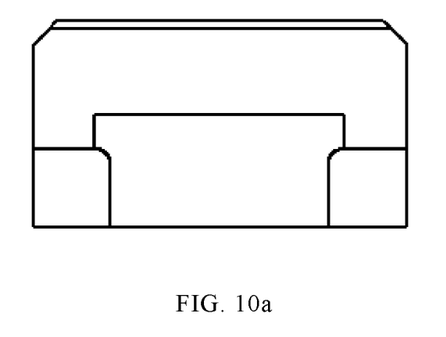
FIG. 10a is a front view of a cover plate in the fluid measurement sensor according to an exemplary embodiment of the present disclosure.
Figure 10B:
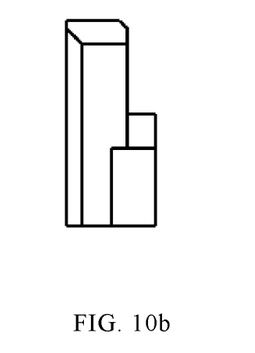
FIG. 10b is a side view of the cover plate.
Figure 11A:
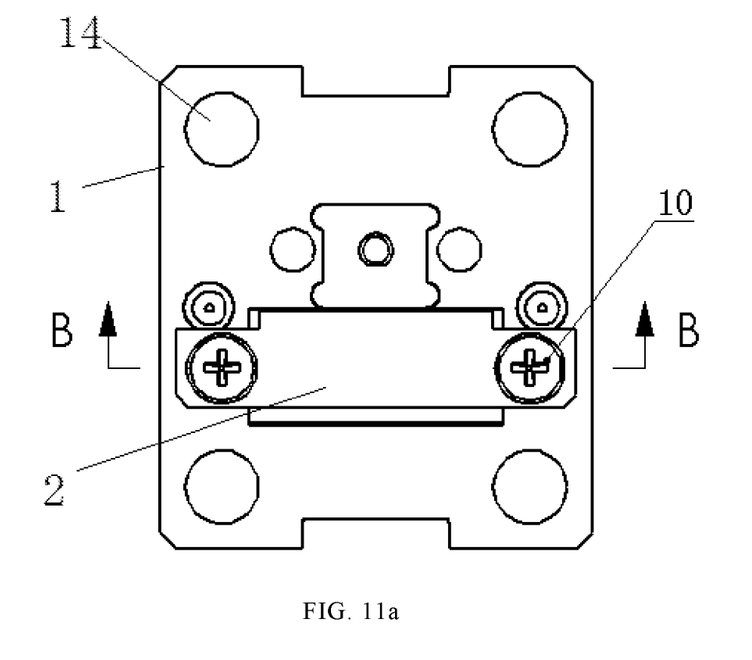
FIG. 11a is a top view of the pressing block and the sensor base, which are connected to each other, in the fluid measurement sensor according to an exemplary embodiment of the present disclosure.
Figure 11B:
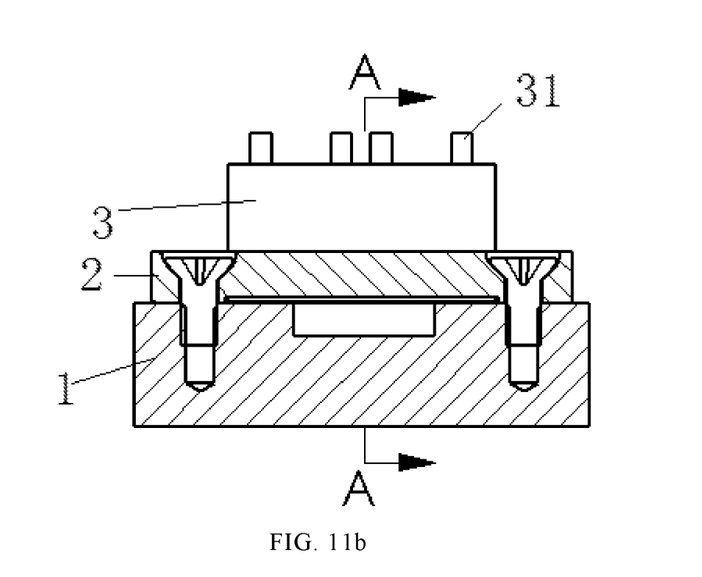
FIG. 11b is a sectional view taken along B-B in FIG. 11a, and FIG. 11c is a sectional view taken along A-A in FIG. 11b.
Figure 11C:
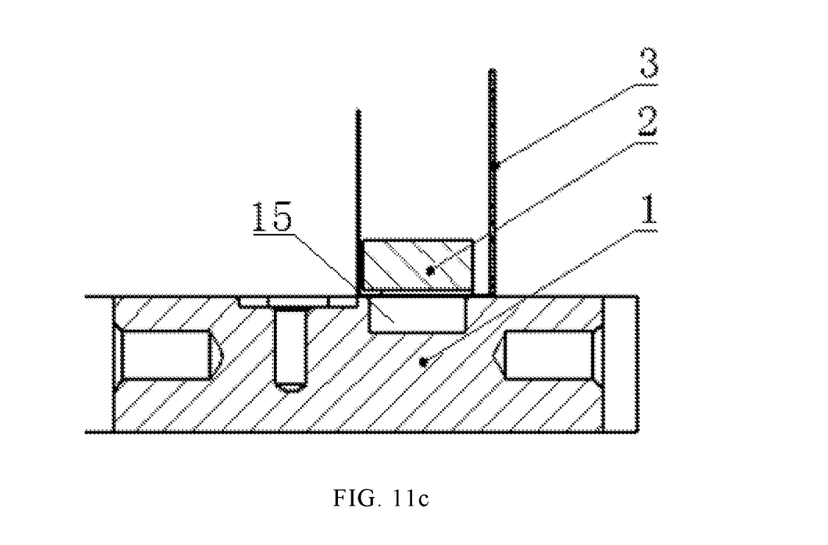

In this embodiment, as shown in FIG. 2 and FIG. 3, the fluid measurement sensor further includes the pressing block 2 and the lead-out wire 3, as shown in FIG. 9a and FIG. 9b, one end of the lead-out wire 3 is provided with the four connection terminals 31, and the two ends of the first winding 91 and the two ends of the second winding 92 (such as four wires 93 shown in FIG. 4) are electrically connected to the four connection terminals 31 respectively; and as shown in FIG. 2c, the pressing block 2 is connected to the sensor base 1, and is located between the cover plate 4 and the sensor base 1. For example, as shown in FIG. 3, the pressing block 2 may be fastened to the sensor base 1 through the two second screws 10. As shown in FIG. 6a and FIG. 6b, the second groove 21 is formed at the bottom of the pressing block 2. As shown in FIG. 11c, the pressing block 2 presses the lead-out wire 3 in the second groove 21, and the other end of the lead-out wire 3 passes through the second groove 21 and extends to the outer side of the cover plate 4 through the space between the pressing block 2 and the sensor base 1. Thus, the lead-out wire 3 can be firmly fixed to ensure the accurate positioning thereof, and meanwhile, the second groove 21 can prevent the lead-out wire 3 from being crushed and misplaced, which is beneficial to the improvement in the operational reliability of the fluid measurement sensor and the reduction of the zero drift. For example, the depth of the second groove 21 is 0.2 mm.

As shown in FIG. 5a and FIG. 11c, the sensor base 1 is provided with the third groove 15, which is disposed opposite to the pressing block 2 and configured to accommodate the electronic component (not shown) on the lead-out wire. With the third groove 15, the electronic component can be prevented from being squeezed. For example, the third groove 15 is a rectangular groove.

Figure 8A:
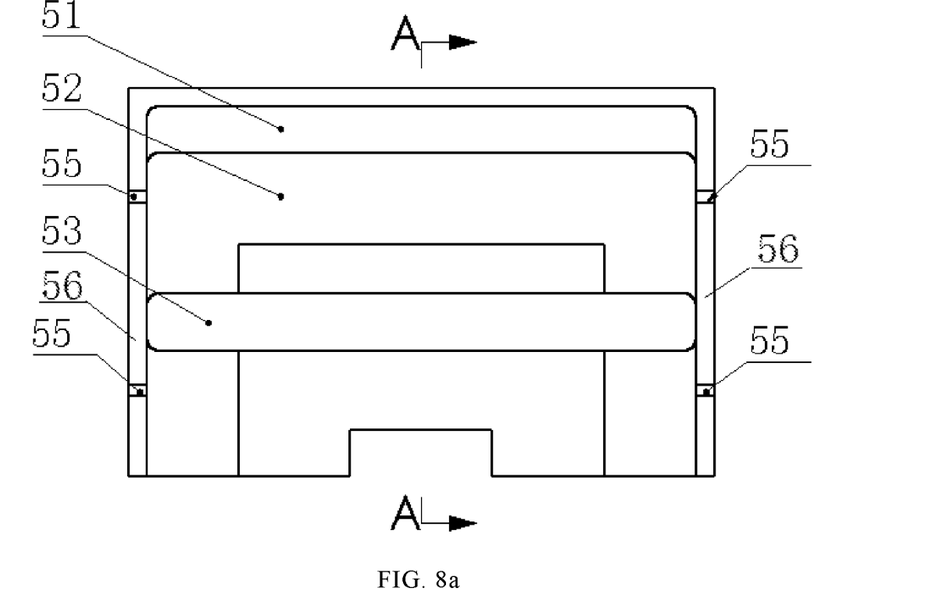
FIG. 8a is a schematic structural diagram of an inner side face of a housing of the fluid measurement sensor according to an exemplary embodiment of the present disclosure.

In this embodiment, as shown in FIG. 2c and FIG. 8a, the inner side face of the housing 5 is provided with the fourth groove 53, and the support portion 732, the second plate 74, and the two mounting arms 75 are located in the fourth groove 53. The fourth groove 53 is configured to accommodate the support portion 732, the second plate 74, and the two mounting arms 75, so as to ensure that the bracket 7 has the enough installation space, and also ensure that the housing 5 does not interfere with the installation of the bracket 7. Further preferably, the support portion 732, the second plate 74, and the two mounting arms 75 in the fourth groove 53 are not in contact with the housing 5, so that the bracket 7 can be prevented from being affected by the temperature change of the housing 5, thereby effectively suppressing the zero drift.

Figure 8B:
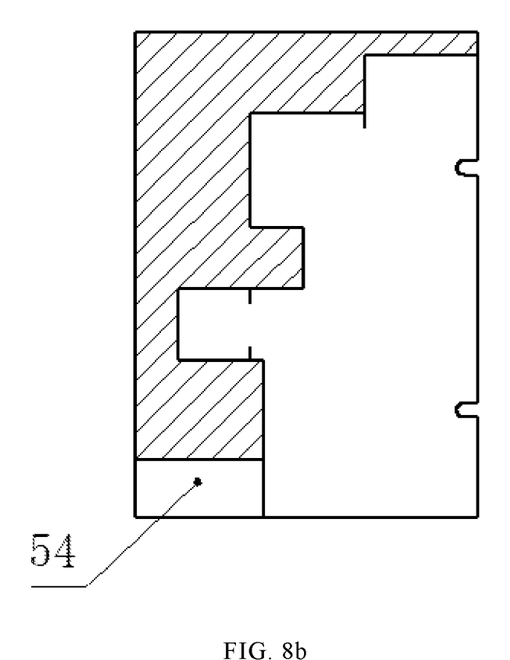

As shown in FIG. 2c and FIG. 8b, the fifth groove 54 is formed at the bottom of the housing 5, the gap is formed between the fifth groove 54 and the first groove 16, and the first screw 8 is located in the gap. The fifth groove 54 is configured to avoid the first screw 8, so as to ensure the normal installation of the first screw 8.

As shown in FIG. 5b, the pair of first annular grooves 11 and the pair of second annular grooves 12 are formed on the bottom surface of the sensor base 1, each first annular groove 11 and each second annular groove 12 are concentrically arranged with one of the third holes 13, and the first annular grooves 11 are on the outer sides of the second annular grooves 12. The first annular grooves 11 are configured to accommodate the sealing rings. When the space between each of the two bent sections (9b, 9c) of the sensing tube 9 and the sensor base 1 is sealed by welding, the second annular grooves 12 may play a role of releasing the stress and ensuring the reliable sealing of the welding. The first annular grooves 11 are configured to accommodate the sealing rings, which perform the sealing function when the flow measurement sensor is applied to the gas mass flow controller.

In this embodiment, as shown in FIG. 2c and FIG. 8a, the inner side face of the housing 5 is provided with the sixth groove 51, the cover plate 4 is located in the sixth groove 51, and the two side edges 56 of the housing 5 located on the two sides of the sixth groove 51 are foldable, so as to fix the cover plate 4 in the sixth groove 51 by folding the two side edges 56 after the cover plate 4 is installed in the sixth groove 51. Such fixing method is simple, can realize the reliable fixing, and can also greatly reduce the volume of the fluid measurement sensor. Apparently, the cover plate 4 may be fixed with the other methods in practical applications, for example, the cover plate 4 may be fixed on the housing 5 by being wrapped with the adhesive tape or by gluing.

Specifically, a frame of the housing 5 may be provided with two openings 55 on each of two sides of the sixth groove 51, a portion of the frame between the two openings 55 on a same side forms one of the side edges 56, and the side edges 56 may be folded inwards relative to the other portions of the frame, so as to fasten the cover plate 4 in the sixth groove 51.

Figure 5C:
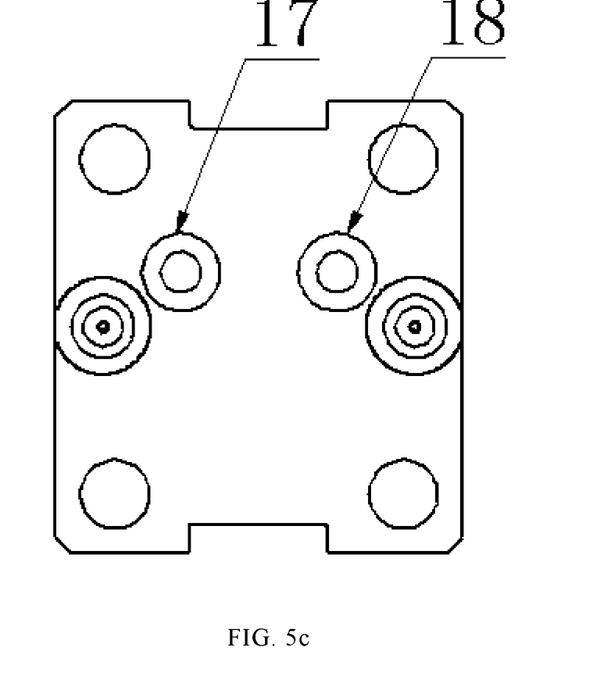
FIG. 5c is a bottom view of the sensor base.

As shown in FIG. 5c, the sensor base 1 is provided with the two first mounting holes (17, 18), and the bottom surface of the housing 5 is provided with the two second threaded holes corresponding to the two first mounting holes (17, 18). One second screw penetrates through one first mounting hole 17 to be in threaded connection with the second threaded hole corresponding to the first mounting hole 17, and the other second screw 10 penetrates through the other first mounting hole 18 to be in threaded connection with the other second threaded hole, thereby fixing the housing 5 on the sensor base 1.

In addition, as shown in FIG. 5a, the sensor base 1 may be further provided with the plurality of second mounting holes 14 for the connection with the mounting component such as the gas mass flow controller.

In summary, in the fluid measurement sensor provided by this embodiment, the mounting groove formed between the cover plate and the housing has the symmetrical structure, the sensing tube is symmetrically arranged, and the windings around the sensing tube are also symmetrically arranged, so that the heat passing through the sensing tube is also symmetrically distributed, thereby facilitating the reduction of the zero drift. Moreover, the fluid measurement sensor of the present disclosure can effectively reduce the zero drift. Therefore, when the fluid measurement sensor is applied to the gas mass flow controller, the indexes such as zero drift, precision, and repeatability of the gas mass flow controller, can be greatly improved, and meanwhile, the production efficiency of the gas mass flow controller can be greatly increased.

Second Embodiment

The present disclosure provides the mass flow controller, including the fluid measurement sensor described in the first embodiment.

The mass flow controller provided by the present disclosure can effectively suppress the zero drift by adopting the fluid measurement sensor provided by the present disclosure.

Embodiments of the present disclosure has been described above. However, the above description is illustrative, but not exhaustive, and the present disclosure is not limited to the disclosed embodiments. Many modifications and variations are apparent to those of ordinary skill in the art without departing from the scope and spirit of the described embodiments.

What is claimed is:

1. A fluid measurement sensor, comprising a sensor base, a cover plate, a housing, a sensing tube, a thermal insulation layer, a pressing block, and a lead-out wire; wherein
the housing is connected to the sensor base, the cover plate is connected to the housing from one side of the housing, an inner sidewall of the housing is provided with a first half groove, an inner sidewall of the cover plate is provided with a second half groove, and the first half groove and the second half groove form a mounting groove;

the sensing tube is provided with windings wound round the sensing tube, the thermal insulation layer wraps the windings, the sensing tube wrapped by the thermal insulation layer is disposed in the mounting groove, and two ends of the sensing tube penetrate through the sensor base;

one end of the lead-out wire is electrically connected to the windings; and the pressing block is connected to the sensor base, and is located between the cover plate and the sensor base, a second groove is formed at a bottom of the pressing block, the pressing block presses the lead-out wire in the second groove, and the other end of the lead-out wire passes through the second groove and extends to an outer side of the cover plate through space between the pressing block and the sensor base.

2. The fluid measurement sensor of claim 1, wherein the sensing tube comprises an enclosed section and two bent sections on two sides of the enclosed section, and the two bent sections are bent along a same direction towards the sensor base relative to the enclosed section; and a shape of the mounting groove is matched with a shape of an integral body formed by the enclosed section and the two bent sections, the windings comprise a first winding and a second winding, the first winding and the second winding are symmetrically wound round the enclosed section, and the thermal insulation layer at least wraps the enclosed section.

3. The fluid measurement sensor of claim 2, wherein the thermal insulation layer is filled in space where the enclosed section is located.

4. The fluid measurement sensor of claim 2, further comprising a bracket comprising a first plate and a second plate, wherein the first plate comprises a bent portion and a support portion, which form an included angle; the sensor base is provided with a first groove having a shape matched with the bent portion, and the bent portion is connected to the first groove through a first screw; and the support portion is located on a side of the bent portion away from the sensor base and is connected to the second plate; and two mounting arms are provided at two ends of the second plate, respectively, and the two mounting arms are provided with a first hole and a second hole respectively, the sensor base is provided with two third holes, and the two third holes are corresponding to the first hole and the second hole respectively; and one of the two bent sections of the sensing tube penetrates through the first hole and one of the two third holes, and extends to a bottom surface of the sensor base, and the other of the two bent sections of the sensing tube penetrates through the second hole and the other of the two third holes, and extends to the bottom surface of the sensor base.

5. The fluid measurement sensor of claim 4, wherein a shape of the bent portion and a shape of the first groove are such set that rotational freedom of the bent portion is limited.

6. The fluid measurement sensor of claim 4, wherein a sealing material is provided between the two bent sections of the sensing tube and the sensor base; and/or the two bent sections of the sensing tube are fixedly connected to the first hole and the second hole respectively through full soldering or full gluing.

7. The fluid measurement sensor of claim 4, wherein an inner side face of the housing is provided with a fourth groove, and the support portion, the second plate, and the two mounting arms are located in the fourth groove; and a fifth groove is formed at a bottom of the housing, a gap is formed between the fifth groove and the first groove, and the first screw is located in the gap.

8. The fluid measurement sensor of claim 4, wherein a pair of first annular grooves and a pair of second annular grooves are formed on the bottom surface of the sensor base, each of the first annular grooves and each of the second annular grooves are concentrically arranged with one of the two third holes, and the first annular grooves are on outer sides of the second annular grooves; and the first annular grooves are configured to accommodate sealing rings.

9. The fluid measurement sensor of claim 2, wherein one end of the lead-out wire is provided with four connection terminals, and two ends of the first winding and two ends of the second winding are electrically connected to the four connection terminals respectively.

10. The fluid measurement sensor of claim 9, wherein the sensor base is provided with a third groove, and the third groove is disposed opposite to the pressing block and configured to accommodate an electronic component on the lead-out wire.

11. The fluid measurement sensor of claim 1, wherein an inner side face of the housing is provided with a sixth groove, the cover plate is located in the sixth groove, and two side edges of the housing located on two sides of the sixth groove are foldable and the two side edges are configured to fix the cover plate in the sixth groove by folding the two side edges after the cover plate is installed in the sixth groove.

12. A mass flow controller, comprising a fluid measurement sensor, wherein the fluid measurement sensor comprises a sensor base, a cover plate, a housing, a sensing tube, a thermal insulation layer, a pressing block, and a lead-out wire; wherein the housing is connected to the sensor base, the cover plate is connected to the housing from one side of the housing, an inner sidewall of the housing is provided with a first half groove, an inner sidewall of the cover plate is provided with a second half groove, and the first half groove and the second half groove form a mounting groove;

the sensing tube is provided with windings wound round the sensing tube, the thermal insulation layer wraps the windings, the sensing tube wrapped by the thermal insulation layer is disposed in the mounting groove, and two ends of the sensing tube penetrate through the sensor base;

one end of the lead-out wire is electrically connected to the windings; and the pressing block is connected to the sensor base, and is located between the cover plate and the sensor base, a second groove is formed at a bottom of the pressing block, the pressing block presses the lead-out wire in the second groove, and the other end of the lead-out wire passes through the second groove and extends to an outer side of the cover plate through space between the pressing block and the sensor base.

13. The mass flow controller of claim 12, wherein the sensing tube comprises an enclosed section and two bent sections on two sides of the enclosed section, and the two bent sections are bent along a same direction towards the sensor base relative to the enclosed section; and a shape of the mounting groove is matched with a shape of an integral body formed by the enclosed section and the two bent sections, the windings comprise a first winding and a second winding, the first winding and the second winding are symmetrically wound round the enclosed section, and the thermal insulation layer at least wraps the enclosed section.

14. The mass flow controller of claim 13, wherein the thermal insulation layer is filled in space where the enclosed section is located.

15. The mass flow controller of claim 13, further comprising a bracket comprising a first plate and a second plate, wherein the first plate comprises a bent portion and a support portion, which form an included angle; the sensor base is provided with a first groove having a shape matched with the bent portion, and the bent portion is connected to the first groove through a first screw; and the support portion is located on a side of the bent portion away from the sensor base and is connected to the second plate; and two mounting arms are provided at two ends of the second plate, respectively, and the two mounting arms are provided with a first hole and a second hole respectively, the sensor base is provided with two third holes, and the two third holes are corresponding to the first hole and the second hole respectively; and one of the two bent sections of the sensing tube penetrates through the first hole and one of the two third holes, and extends to a bottom surface of the sensor base, and the other of the two bent sections of the sensing tube penetrates through the second hole and the other of the two third holes, and extends to the bottom surface of the sensor base.

16. The mass flow controller of claim 15, wherein a shape of the bent portion and a shape of the first groove are such set that rotational freedom of the bent portion is limited.

17. The mass flow controller of claim 15, wherein a sealing material is provided between the two bent sections of the sensing tube and the sensor base; and/or the two bent sections of the sensing tube are fixedly connected to the first hole and the second hole respectively through full soldering or full gluing.

18. The mass flow controller of claim 15, wherein an inner side face of the housing is provided with a fourth groove, and the support portion, the second plate, and the two mounting arms are located in the fourth groove; and a fifth groove is formed at a bottom of the housing, a gap is formed between the fifth groove and the first groove, and the first screw is located in the gap.

19. The mass flow controller of claim 13, wherein one end of the lead-out wire is provided with four connection terminals, and two ends of the first winding and two ends of the second winding are electrically connected to the four connection terminals respectively.

20. The mass flow controller of claim 19, wherein the sensor base is provided with a third groove, and the third groove is disposed opposite to the pressing block and configured to accommodate an electronic component on the lead-out wire.

* * * * *